Dec. 10, 1929.  H. D. LLOYD  1,739,320
DISAPPEARING PICTURE ILLUMINATOR
Filed May 25, 1928   3 Sheets-Sheet 1
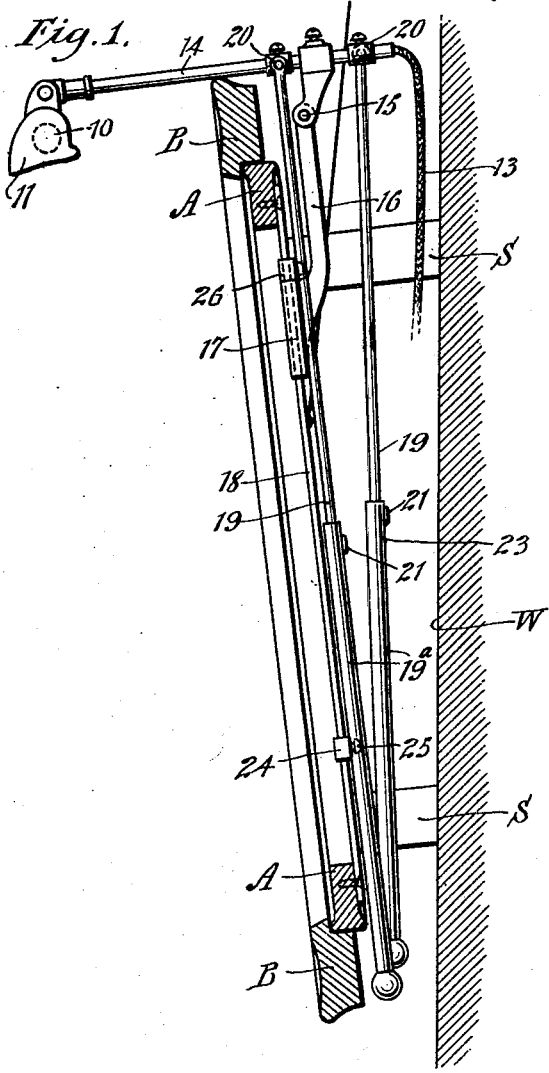
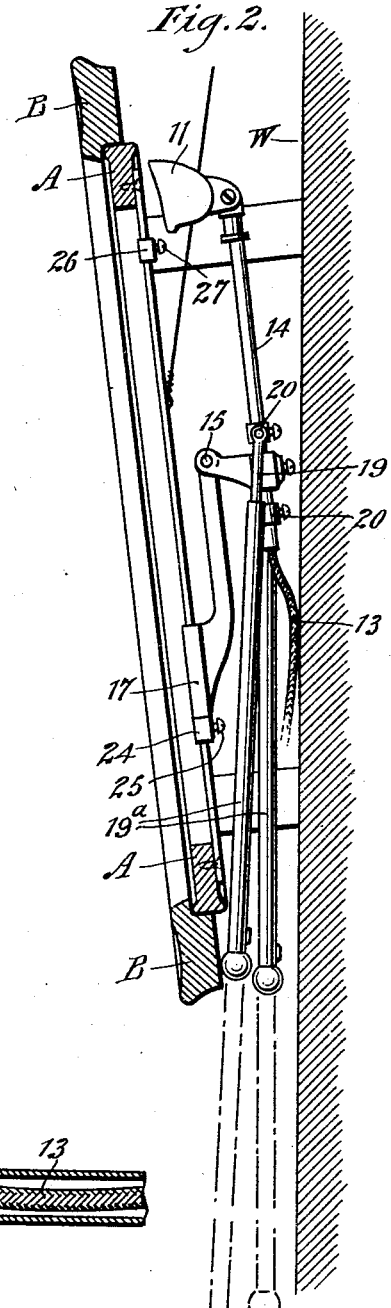
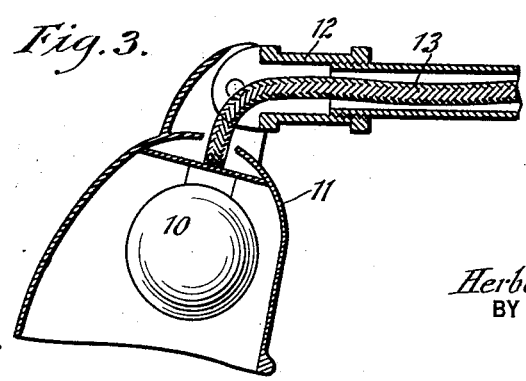
WITNESSES
Edw. Thorpe
INVENTOR
Herbert D. Lloyd
BY
Munn & Co.
ATTORNEY Dec. 10, 1929.　　　H. D. LLOYD　　　1,739,320
DISAPPEARING PICTURE ILLUMINATOR
Filed May 25, 1928　　　3 Sheets-Sheet 2

WITNESSES
Edw. Thorpe
Hugh H. Cott

INVENTOR
Herbert D. Lloyd
BY
ATTORNEY

Dec. 10, 1929.  H. D. LLOYD  1,739,320
DISAPPEARING PICTURE ILLUMINATOR
Filed May 25, 1928  3 Sheets-Sheet 3
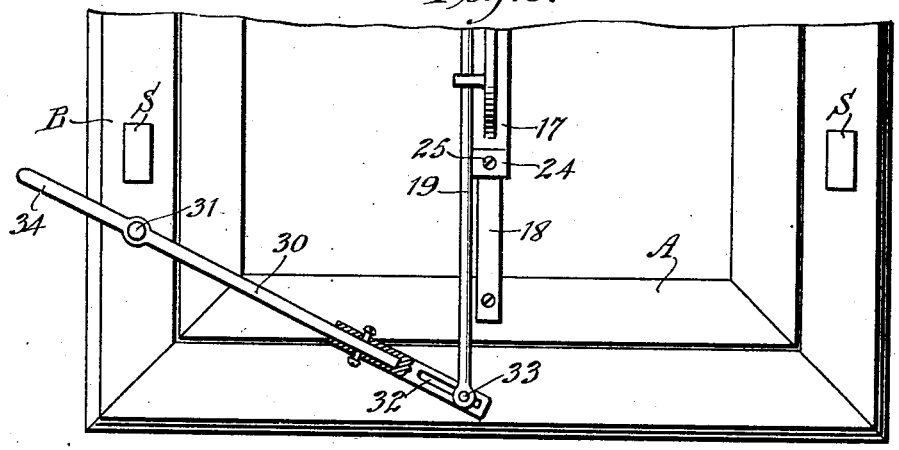
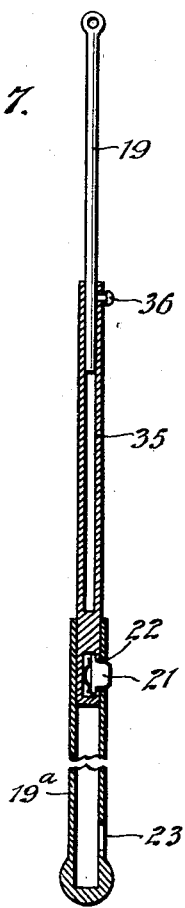
WITNESSES
INVENTOR
Herbert D. Lloyd
BY
ATTORNEY Patented Dec. 10, 1929

1,739,320

UNITED STATES PATENT OFFICE

HERBERT D. LLOYD, OF NEW YORK, N. Y.

DISAPPEARING PICTURE ILLUMINATOR

Application filed May 25, 1928. Serial No. 280,602.

This invention relates to illuminating devices for flood lighting the face of framed pictures, and aims for its principal object to provide an improved means for mounting the illuminator on the rear of the picture for movement from a concealed position therebehind to an exposed projecting position for flood lighting the face of the picture.

The invention further comprehends a mounting for picture illuminators, by virtue of which the lamp and reflector element may be instantaneously and readily moved from its concealed inactive position to its exposed active position or vice versa, which mounting functions to completely conceal the illuminator and its operating means from view when not in active use.

Other objects of the invention reside in the simplicity of construction and mode of operation of the device, the economy with which it may be produced and attached to a picture and the general efficiency derived therefrom.

With the above recited and other objects in view, reference is had to the following description and accompanying drawings, in which there are exhibited several examples or embodiments of the invention, while the claims define the actual scope of the same.

In the drawings:

Figure 1 is a vertical sectional view through a framed picture equipped with a disappearing illuminator constructed in accordance with the invention and illustrating the same in its exposed active position for flood lighting the face of the picture.

Figure 2 is a similar view illustrating the illuminator in its inactive concealed position behind the picture.

Figure 3 is a detail sectional view through the lamp housing and reflector.

Figure 6 is a fragmentary rear view of a picture illustrating a modified form of actuating means for the illuminator mounting.

Figure 7 is a longitudinal sectional view through an actuator rod which is adjustable for increasing and decreasing its length to compensate for variations in the size of the pictures to which the disappearing illuminator is applied.

Figure 4:
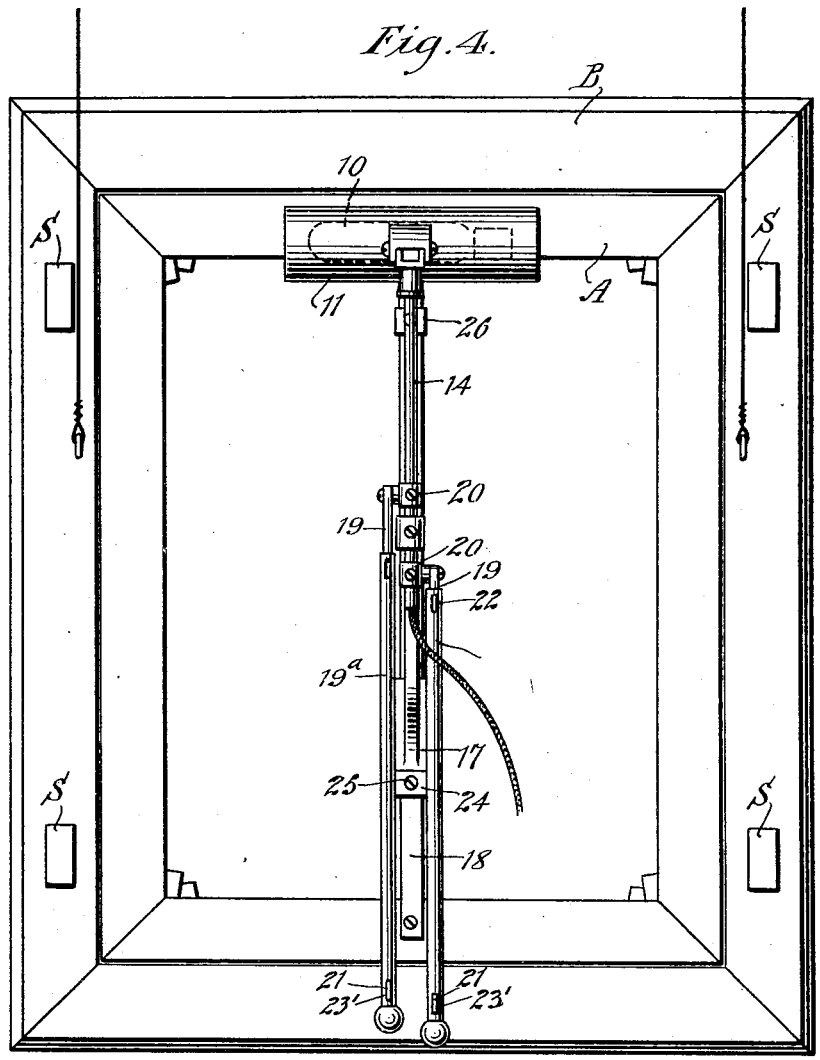
Figure 4 is a rear view of the picture with the illuminator in its inactive concealed position.
Figure 5:
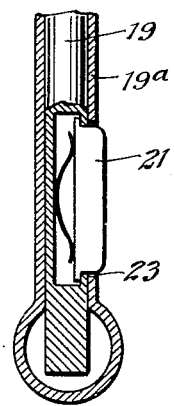
Figure 5 is an enlarged detail sectional view through the operating rod illustrating the latch element for holding the telescopic section in adjusted position.

Referring to the drawings by characters of reference, A designates a picture and B the picture frame. The illuminator may be of any type, but as illustrated, the same consists of a lamp 10 supported in a combined lamp housing and reflector 11 angularly adjustable on a sleeve 12, the attachment cord 13 leading through the reflector and housing 11 and through the sleeve 12. The device for mounting the illuminator consists of a tubular arm 14, to which the sleeve 12 is attached and through which arm the extension cord 13 is trained and led to a socket from which the current is received for energizing the lamp 10. The arm 14 is fulcrumed at 15 to a bracket 16. The bracket 16 is provided with a tubular base 17 which is slidable over a vertically disposed bar 18 attached to the rear of the picture A. An actuating rod 19 is pivoted at 20 to the arm 14 and depends therefrom to afford a common means for swinging the arm 14 on its fulcrum 15 and for effecting vertical movement of the bracket 16 with respect to the picture A. In view of the fact that some clearance space must be afforded between the wall W and the picture A whereby access may be gained to the actuating rods, stilts S are carried by the picture or its frame and engage with the wall surface. In practice, it has been found desirable to employ upper and lower sets of stilts S to afford proper clearance space for the operation of the mounting device. It is also obvious that if the actuating rod 19 is sufficiently long enough to have its lower end disposed adjacent the lower edge of the picture when the illuminator is in its exposed active position as illustrated in Figure 1, that the lower end of the rod will be exposed and extend below the lower edge of the picture frame when the illuminator is moved to its concealed inactive position. In order, therefore, to provide means to overcome this, the rod 19 is provided with a tubular telescopically associated lower section 19ª, while the upper main section 19 is provided at its lower end with a spring pressed latch or catch element 21 which is adapted to selectively engage through keeper openings 22 and 23 provided respectively in the telescopic section 19ª adjacent its upper and lower ends. While it is possible to actuate the sliding bracket 16 and to rock or swing the arm 14 on its fulcrum 15 by means of one actuating rod 19, the sliding and rocking action may be more effectually accomplished by employing two rods 19 which will be pivotally connected to the arm on opposite sides of its fulcrumed connection 15 with the bracket.

In use and operation, with the illuminator in its active position illustrated in Figure 1, the same is moved to its concealed inactive position behind the picture by grasping the lower end section 19ª of the right-hand rod and exerting a downward pull thereon to initially swing the arm 14 upwardly. Continued downward movement will be practically caused by gravity, as the sliding bracket 16 will move downwardly on the bar 18. This gravitational movement may be controlled by the rod 19, or where two of the rods are used, by both of the rods. In order to arrest the downward movement, a stop element 24 is provided on the rod 18 adjacent its lower end which engages with the lower end of the base portion 17 of the bracket 16. The stop element 24 is adjustably secured on the bar 18 by a set screw 25. After the illuminator has been moved to the concealed inactive position illustrated in Figure 2, the telescopic lower end sections 19ª of the actuating rods 19 which extend below the lower end of the picture as illustrated in Figure 2, are moved upwardly by releasing the catches 21 from the uppermost keeper openings 22 and allowing said latches to engage in the lowermost openings 23.

With the illuminator in the concealed inactive position illustrated in Figure 2, movement of the same to active exposed position is accomplished by first releasing the catches 21 from the lower keeper openings 23 of the lower telescopic sections 19ª of the actuating rods 19 and pulling downwardly on the lower sections 19ª until the catches 21 engage in the upper keeper openings 22. By grasping the lower sections 19ª of the rods 19 and exerting an upward push thereon, the slide bracket 16 will be moved upwardly on the bar 18 until it engages with an upper stop element 26 which is held by a retaining screw 27 on the upper portion of the bar 18. When the base 17 of the slide bracket engages the upper stop element 26, a downward pull on the left-hand rod 19 combined with an upward push on the right-hand rod 19 will cause the arm 14 to swing downwardly and outwardly on its fulcrum 15 so that the arm rests on the upper edge of the picture frame. The weight of the lamp housing and lamp will sufficiently overbalance the weight of the operating elements to hold the same in its exposed projected active position.

In some instances, it may be found desirable to operate the device from the side of the picture, and in such instances a lever 30 is fulcrumed at 31 to the side rail of the picture frame B, as illustrated in Figure 6. The inner end of the lever is provided with a slotted terminal member 32, in the slotted portion of which a pin 33 carried by the lower end of the operating rod 19 is engaged. It is thus obvious that by grasping the outer end 34 of the lever and exerting a downward pressure thereon, the rod 19 will be moved upwardly to effect the projection of the illuminator to the exposed active position, and conversely, when the illuminator is in its exposed active position an upward movement on the outer end 34 of the lever will effect a downward movement of the actuating rod 19 to swing and move the illuminator to its concealed inactive position behind the picture frame.

In order to compensate for variations in the height of the picture frame and picture to which the device is attached, the actuating rod 19 may be rendered longitudinally adjustable for increasing and decreasing its length by forming the same with an additional telescopic section 35 which is preferably of tubular formation and which is held in telescopic adjustment by a set screw 36. In this instance, the catch 21 is carried by the lower end of the section 35 and operates in conjunction with the keeper openings 22 and 23 of the telescopic lower end member 19ª.

What is claimed is:

1. A picture illuminating device comprising a lamp and reflector and means for mounting the same on the rear of a picture for vertical sliding and pivotal movement whereby the same may be moved respectively from a completely concealed inactive position behind the picture to an outwardly projecting exposed active position for illuminating the face of the picture.

2. A mounting for picture illuminators comprising a vertically slidable bracket mounted on the rear of a picture, an arm pivotally connected to said bracket and an actuator connected with the arm and depending therefrom constituting a common means for effecting the vertical sliding movement of the bracket and swinging movement of the arm.

3. A mounting for picture illuminators comprising a vertically slidable bracket mounted on the rear of a picture, an arm pivotally connected to said bracket and an actuator connected with the arm and depending therefrom constituting a common means for effecting the vertical sliding movement of the bracket and swinging movement of the arm, said actuator consisting of an actuator rod pivotally connected with the arm.

4. A mounting for picture illuminators comprising a vertically slidable bracket mounted on the rear of a picture, an arm pivotally connected to said bracket and an actuator connected with the arm and depending therefrom constituting a common means for effecting the vertical sliding movement of the bracket and swinging movement of the arm, said actuator consisting of a longitudinally adjustable actuator rod pivotally connected with the arm.

5. A mounting for picture illuminators comprising a vertically slidable bracket mounted on the rear of a picture, an arm pivotally connected to said bracket and an actuator connected with the arm and depending therefrom constituting a common means for effecting the vertical sliding movement of the bracket and swinging movement of the arm, said actuator consisting of an actuator rod pivotally connected with the arm and including a telescopically associated lower end section movable upwardly on the main portion of the rod to a position behind and concealed by the picture when the illuminator is in its concealed inactive position.

6. A mounting for picture illuminators comprising a vertically slidable bracket mounted on the rear of a picture, an arm pivotally connected to said bracket and an actuator connected with the arm and depending therefrom constituting a common means for effecting the vertical sliding movement of the bracket and swinging movement of the arm, said actuator consisting of an actuator rod pivotally connected with the arm and including a telescopically associated lower end section movable upwardly on the main portion of the rod to a position behind and concealed by the picture when the illuminator is in its concealed inactive position and extensible downwardly to a disposed depending position below the lower edge of the picture for manipulation.

7. A mounting for picture illuminators comprising a vertically slidable bracket mounted on the rear of a picture, an arm pivotally connected to said bracket, an actuator connected with the arm and depending therefrom constituting a common means for effecting the vertical sliding movement of the bracket and swinging movement of the arm, said actuator consisting of an actuator rod pivotally connected with the arm and including a telescopically associated lower end section movable upwardly on the main portion of the rod to a position behind and concealed by the picture when the illuminator is in its concealed inactive position and extensible downwardly to a disposed depending position below the lower edge of the picture for manipulation and means for respectively latching the telescopic lower end of the rod in either of said positions.

8. In a picture illuminator, a mounting for the lamp and reflector element comprising a bar secured vertically to the rear of a picture, a bracket vertically slidable on the bar, an arm carrying the lamp and reflector and fulcrumed to the bracket and a rod pivotally connected to the bracket and depending therefrom to provide a common means for sliding the bracket on the bar and for swinging the arm with respect to the bracket.

9. In a picture illuminator, a mounting for the lamp and reflector element comprising a bar secured vertically to the rear of a picture, a bracket vertically slidable on the bar, stops carried by the bar for limiting the sliding movement of the bracket, an arm carrying the lamp and reflector and fulcrumed to the bracket and a rod pivotally connected to the bracket and depending therefrom to provide a common means for sliding the bracket on the bar and for swinging the arm with respect to the bracket.

Signed at New York in the county of New York and State of New York this 24th day of May, A. D. 1928.

HERBERT D. LLOYD.